(12) United States Patent
Stenbaek Nielsen et al.

(10) Patent No.: US 8,986,487 B2
(45) Date of Patent: Mar. 24, 2015

(54) CONSOLIDATED COMPOSITE PRE-FORM

(75) Inventors: Knud Stenbaek Nielsen, Skjern (DK); Henning Schroder, Hvide Sande (DK)

(73) Assignee: Vestas Wind Systems A/S, Aarhus N. (DK)

( * ) Notice: Subject to any disclaimer, the term of this patent is extended or adjusted under 35 U.S.C. 154(b) by 320 days.

(21) Appl. No.: 12/989,889

(22) PCT Filed: Apr. 29, 2009

(86) PCT No.: PCT/EP2009/055208
§ 371 (c)(1),
(2), (4) Date: Oct. 27, 2010

(87) PCT Pub. No.: WO2009/133143
PCT Pub. Date: Nov. 5, 2009

(65) Prior Publication Data
US 2011/0044820 A1    Feb. 24, 2011

Related U.S. Application Data

(60) Provisional application No. 61/049,039, filed on Apr. 30, 2008.

(30) Foreign Application Priority Data

Apr. 30, 2008 (DK) .................................. 2008 00615

(51) Int. Cl.
*B29C 65/00* (2006.01)
*B29C 70/34* (2006.01)
*B29C 70/54* (2006.01)
*B29L 31/08* (2006.01)

(52) U.S. Cl.
CPC ............. *B29C 70/342* (2013.01); *B29C 70/547* (2013.01); *B29L 2031/08* (2013.01)

USPC .......... 156/261; 156/60; 156/87; 156/244.22; 156/244.27

(58) Field of Classification Search
None
See application file for complete search history.

(56) References Cited

U.S. PATENT DOCUMENTS

| 4,273,601 A | 6/1981 | Weingart |
| 5,104,718 A | 4/1992 | Asada et al. |
| 2004/0146696 A1* | 7/2004 | Jones ............................ 428/167 |

(Continued)

FOREIGN PATENT DOCUMENTS

| DK | 130714 B | 4/1975 |
| EP | 1 595 689 | 11/2005 |

(Continued)

OTHER PUBLICATIONS

R. Wachsmuth; Select pages from Aeolus II Report; pp. 77-128; May 1992; MBB Deutsche Aerospace.

(Continued)

*Primary Examiner* — D. Lawrence Tarazano
*Assistant Examiner* — Camie Thompson
(74) *Attorney, Agent, or Firm* — Wood, Herron & Evans, LLP (57) ABSTRACT

The present invention relates to a consolidated composite pre-form for reinforcing a composite structure, said pre-form comprising fibers and a binding agent, said pre-form having a sheet-like structure with an upper major surface and a lower major surface, and said pre-form being provided with recesses on at least a portion of at least one of said major surfaces.

25 Claims, 2 Drawing Sheets

(56) References Cited

U.S. PATENT DOCUMENTS

| | | |
|---|---|---|
| 2006/0172636 A1 | 8/2006 | Bech |
| 2006/0175731 A1 | 8/2006 | Bech et al. |

FOREIGN PATENT DOCUMENTS

| | | | |
|---|---|---|---|
| EP | 1754 589 | | 2/2007 |
| JP | 4 89208 | | 3/1992 |
| WO | 02/081189 | | 10/2002 |
| WO | 02/090089 | | 11/2002 |
| WO | WO2004/078443 | * | 9/2004 |
| WO | WO2004/078462 | * | 9/2004 |
| WO | 2006/082479 | | 8/2006 |

OTHER PUBLICATIONS

R. Wachsmuth; English translation of Rotor Blade of Composite Fiber Design for the Wind Power Installation; Aeolus II, Phase I & II; 21 pages; May 1992; Federal Ministry for Research and Technology.

Cheng-Huat Ong et al; Document entitled The Use of Carbon Fibers in Wind Turbine Blade Design: A Seri-8 Blade Example; Mar. 2000; 78 pages; Stanford, CA.

Dmitri Burdykin; Translation of 1st Technical Assessment issued in priority Denmark Application No. PA 2008 00615; Dec. 2008; 6 pages; Denmark Patent and Trademark Office.

Office Action from the European Patent Office in counterpart European Application No. 09738187.5 mailed on May 4, 2012 (4 pages).

Alberto Fregosi; International Search Report issued in priority application No. PCT/EP2009/055208; Oct. 8, 2009; 4 pages; European Patent Office.

Alberto Fregosi; International Preliminary Report on Patentability issued in priority application No. PCT/EP2009/055208; Aug. 12, 2010; 5 pages; European Patent Office.

* cited by examiner

CONSOLIDATED COMPOSITE PRE-FORM

This application is a national stage entry of International Application No. PCT/EP2009/055208, filed Apr. 29, 2009 which claims the benefit of DK Application No. PA 2008 00615, filed Apr. 30, 2008 and U.S. Provisional Application No. 61/049,039, filed Apr. 30, 2008. Each of these applications is incorporated by reference herein in its entirety.

FIELD OF THE INVENTION

The present invention relates to a pre-consolidated pre-form for reinforcing a composite structure, comprising fibres and a binding agent. The invention also relates to a method of producing a pre-form, to a method of producing a reinforced composite structure, to a wind turbine blade and to a wind turbine generator comprising a wind turbine blade.

BACKGROUND OF THE INVENTION

Composite structures, such as wind turbine blades, comprise a plurality of layers of sheets made of fibres embedded in a resin. These sheets are traditionally cut from an endless sheet material and stacked in layers on each other to form a composite structure. The composite structure is then consolidated by removal of any air trapped between the layers of the structure, usually by applying a vacuum. During this consolidation procedure, additional resin may be introduced to, or infused in, the structure to fill any voids therein to strengthen the structure.

WO 2006/082479 relates to an endless cured composite sheet material for manufacturing a wind turbine blade shell member. The cured sheet material is cut into elements, which elements are stacked overlapping in a mould, wherein resin is introduced between the elements and cured to bind the elements to each other. The elements may have a surface texture which facilitates introduction of resin between adjacent elements.

EP 1 754 589 relates to a continuous cured laminate, which, during manufacture, is provided with channels for a curable material to move in, during an infusion process, between layers of the continuous laminate arranged in a stack.

US 2006/0175731 relates to a method of preparing a more reliable connection between two adjacent composite members for the production of wind turbine blades and spars for such blades. The method involves the use of a gas-removal layer, which allows for gas transport in a number of overall directions in a plane of the gas-removal layer. The gas-removal layer comprises a resin and is deformed during consolidation to form a connection substantially free of trapped gas voids.

These documents have the objective of constructing larger structures from stacked sheets. Such construction has a problem with air being trapped within the structure, causing weak zones reducing the overall strength of the structure. The present invention provides an improved technique of facilitating the removal of such trapped air.

SUMMARY OF THE INVENTION

According to one aspect of the present invention, there is provided a consolidated composite pre-form for reinforcing a composite structure; said pre-form comprising fibres and a binding agent; said pre-form having a sheet-like structure with an upper major surface and a lower major surface; and said pre-form being provided with recesses on at least a portion of at least one of said major surfaces.

Since the inventive pre-form is provided with recesses on at least a portion of at least one of its major surfaces, air trapped between said portion of said surface and another surface, during production of a reinforced composite structure, is enabled to escape through said recesses, the recesses forming channels together with the other surface. Also, excess binding agent of the pre-form may depart through the channels, or infused binding agent may enter through the channels. To minimise the amount of trapped air within a composite structure is of great importance, since the voids in the structure formed by such trapped air may weaken the structure substantially.

The inventive pre-form, also known as a slab, is consolidated, implying that the different components of the composite pre-form, such as fibres and resin, have been combined into a single member.

Since the inventive pre-form has a sheet-like structure, it has two major surfaces, one upper major surface, i.e. the upper side, and one lower major surface, i.e. the underside. Also, since the inventive pre-form has a sheet-like structure, it is delimited in all three dimensions of space, whereby each of its major surfaces have an area defined by an outer boundary. Said boundary can be defined by longitudinal and transverse edges of said sheet-like structure. The pre-form does thus not have an endless structure. An advantage of not using an endless structure, which is then cut into smaller pieces to fit in a composite structure, is that no waste sheet material is produced. When endless sheet material is used it is often impossible to use up the entire sheet when cutting it into smaller parts of the desired size and shape; there will in most cases be leftovers that will need to be thrown away, thus increasing the production costs.

The inventive pre-form may be uncured, or only partially cured. This allows the pre-form to be bent and formed to fit in a composite structure which it should reinforce. The binding agent could be chosen such that it has a viscosity, under the relevant storage conditions, high enough to maintain the integrity of the pre-form even in an uncured state.

The inventive pre-form may be a pre-preg, i.e. the pre-form is impregnated with a binding agent. Thus, there is no need to introduce additional binding agent to the pre-form at a later stage, such as during consolidation of a final composite structure of which the pre-form is a part.

As discussed above, the recesses of the inventive pre-form facilitate the removal of air from an interface between the pre-form and a surface, to which the pre-form is applied. In order for this removal to be more effective, the recesses may extend at least from a longitudinal centreline of the pre-form to an outer edge of said pre-form, preferably a longitudinal edge. In this way air may be transported from the interface to the surrounding medium, usually into a space between two composite layers, of the composite structure of which the pre-form is a part, or a bleeder structure. By a recess extending to, or across, the longitudinal centreline, even air located in the interface close to the centreline may be transported from the interface.

Even if the transport of air located close to the pre-form longitudinal centreline in the interface between the pre-form and a surface to which the pre-form is applied is facilitated by a recess extending to, or across, the longitudinal centreline, it may be sufficient for a recess to extend almost to the centreline, but not completely reaching it or crossing it, in order to transport air located in the interface close to the centreline away from the interface. Depending e.g. on the resin viscosity, it may be enough for a recess to reach within e.g. 10, 5 or 2 cm of the centreline to enable transport of interface air from the centreline to an outer edge. In analogy, it may be enough for a recess to reach within e.g. 10, 5 or 2 cm of an outer edge of the pre-form to enable transport of interface air to the pre-form surroundings. How close to the centreline or an edge a recess needs to reach in order to enable air transport from the centreline may also be dependent on the size of the pre-form surface. Thus, it may be enough for a recess to extend over at least two thirds, preferably three fourths, more preferably four fifths, of the distance between the centreline and an outer edge.

When the recesses extend transversely at least from the longitudinal centreline to a longitudinal edge of the pre-form, the air may take the shortest route possible to leave the interface. If a recess extends from the centreline to both longitudinal edges of the pre-form, the recess effectively extends from one longitudinal edge to another longitudinal edge of the pre-form. However, it may be sufficient for a channel to extend at an angle to the centreline in order to enable air transport from an interface between the pre-form and another surface. Thus, at least one, possibly all, of the recesses may extend at an angle of between 30 and 90 degrees in relation to the pre-form longitudinal centreline, more advantageously between 50 and 90 degrees or between 70 and 90 degrees.

The recesses may be straight or curvy. In order to provide easier transportation of air, it may be preferred that one, some or all of the recesses are straight.

Of course, other recess patterns/extensions may be used, depending on the intended use of the pre-form. If, for instance, they should remove air from an interface between a pre-form and a surface, where said interface is at a portion at a longitudinal edge of the pre-form, it may be preferred to have channels extending in a substantially longitudinal direction.

The recesses could be of any size sufficient to allow trapped air to be removed through them. By way of example, they may have a depth of between 0.5 and 2 mm.

The recesses are preferably wider at the edge of the pre-form than at the longitudinal centreline of the pre-form. Preferably the recesses expand continuously with an increasing distance from the centreline, to be at their widest at the pre-form edge. This allows air transported through channels formed by the recesses to expand as it gets closer to the edge of the pre-form. The air in an interface between two composite sheets in a composite structure is often removed by applying a vacuum to the composite structure. An air bubble moving outwards through the structure will thus expand along the way as the pressure gets lower.

The fibres can have the form of tows, yarns or strands. Different types of fibres, such as glass fibres, carbon fibres, synthetic fibres, biofibres, mineral fibres, and metal fibres can be used, depending on the final use of the pre-form. For reinforcing a large composite structure, which is subject to significant stress, such as a wind turbine blade spar, carbon fibres are preferred, since they are much stronger than e.g. glass fibres.

The binding agent is preferably a thermosetting binding agent, such as a thermosetting resin, allowing the agent to be cured in a controlled manner by applying heat. Curing may also be initiated by e.g. microwaves, X-rays, UV light or any other radiation, depending on the binding agent system used. Said binding agent may be a thermosetting epoxy resin. Such a resin has a latency, allowing curing whenever desired by heating the resin to above a certain temperature, but without the resin being cured below said certain temperature. An epoxy resin also provides a very strong bond when cured and is free of solvents.

The recesses may have been introduced into the inventive pre-form by any means, such as by imprinting, printing, e.g. with a binding agent, on the pre-form surface, carving, corroding, eroding, die-cutting, etc, to form a recess pattern on the pre-form surface. Imprinting can be made very simple, especially if the pre-form is not cured, by lowering a punch onto the pre-form surface and pressing. The imprinting may be performed during consolidation of the pre-form, but may also be performed at a later stage, but before enclosing the pre-form in a composite structure. A reason for waiting with the imprinting is if, at the time of production of the pre-form, it is not yet decided exactly how the pre-form is to be used and combined with other elements.

The recesses may be provided on at least a portion of the at least one of said major surfaces, meaning that the recesses may be arranged over the entire major surfaces of the inventive pre-form, or limited to only those portions of the inventive pre-form which are intended to overlap with other pre-forms. Those other pre-forms can be in accordance with the present invention. Since overlaps usually only involve the end portions of the pre-form, i.e. those portions of the pre-form which are positioned at the transverse edges of the pre-form, or the portions of the pre-forms at the longitudinal edges of the pre-form, it is in most cases sufficient if only one or more of those portions of the major pre-form surfaces are provided with recesses. An advantage of this is that the manufacture of the pre-form is simplified since fewer recesses need to be provided. It should also be noted that if two pre-forms of the present invention are placed overlapping each other, only one of said pre-forms needs to be provided with recesses on a surface in the interface with the other pre-form in order to form channels in said interface. However, recesses may be provided on both pre-forms.

The inventive pre-form may comprise alternating layers of fibres and a binding agent, as also discussed below in respect of the method of producing a pre-form forming a laminate structure. Thus, the pre-form may comprise a first layer of a binding agent, followed by a first fibre layer positioned on said first layer of a binding agent, followed by a second layer of a binding agent on said first fibre layer, followed by a second fibre layer, etc. The pre-form may comprise any number of layers, depending on how thick a pre-form is desired. Preferably, the pre-form comprises at least two fibre layers, more preferably at least three fibre layers, with layers of a binding agent in between. The pre-form may have a thickness of from about 1 mm to about 20 mm, more preferably from 4 mm to 15 mm, and even more preferably from 5 mm to 10 mm.

The pre-forms may be rectangular, to simplify production thereof, but other geometrical forms, such as a tapered or trapezoid form, may be advantageous depending on the intended use of the pre-form. For the production of wind turbine blade spars, the pre-form can be tapered in its longitudinal direction in order to fit the shape of a wind turbine blade. In the case of such a tapered form, the longitudinal edges of the pre-form will not be parallel to each other.

According to another aspect of the present invention, there is provided a method of producing a pre-form, comprising: providing a layer of a binding agent; providing a fibre layer of fibres or fibre tows on said layer of a binding agent to produce a sheet-like pre-form of fibres and binding agent, said pre-form having an upper major surface and a lower major surface; and providing recesses on at least a portion of at least one of said major surfaces.

According to this inventive method, a pre-form is produced by providing a layer of a binding agent, e.g. on a flat work surface, after which fibres or fibre tows are provided on said binding agent layer. The fibres or fibre tows may be aligned parallel to each other to form a unidirectional composite material together with the binding agent. However, the fibres or fibre tows may in some embodiments, depending on the intended use of the pre-form and how the pre-form is adapted to withstand stress, be arranged bidirectionally, e.g. forming a mesh with longitudinal fibres/tows and transverse fibres/tows arranged perpendicular to each other, or arranged omni-directionally, e.g. in a random way, or arranged in any other way depending on the intended properties of the pre-form. The fibres or fibre tows may be cut to any desired length as they are placed on the binding agent layer. In some cases it may also be convenient to use cut fibres, staple fibres, or cut tows, instead of fibres/tows/yarns/strands extending across the entire pre-form.

Since the produced pre-form has a sheet-like structure, it is produced in a form which is delimited in all three dimensions of space. The produced pre-form is thus not endless. The layer of a binding agent is provided as a layer having an area defined by an outer boundary.

The a binding agent of the pre-form may be not cured, or only partly cured.

Further layers of binding agent and/or fibre may be added depending on how thick a pre-form is desired. The pre-form may comprise an arbitrary number of layers of fibres, or fibre tows, and binding agent, depending on the desired thickness of the pre-form, which is dependent on the intended use of the pre-form. The pre-form may thus be made to have a thickness of from about 1 mm and upwards.

The pre-form may be prepared by identical types of fibres or fibre tows. Alternatively, one layer of fibres or fibre tows may be made of e.g. carbon fibre, whereas another layer may be made of e.g. glass fibre.

In order to make the pre-form more rigid and manageable as a piece, and in order to remove air to avoid weakening of the final composite structure, as discussed above, the pre-form is preferably consolidated. This can be achieved by, for instance, enclosing the pre-form and evacuating the air in the enclosure. The inventive pre-form thus substantially offers an improved way of minimising the amount of trapped air within a final composite structure, since air is first removed from the pre-form, in the consolidation of the same. The amount of air to be removed during the consolidation of a composite structure, of which the inventive pre-form has been made a part, is thus reduced, especially in the parts of the structure where it was desired to reinforce the structure, which parts are the parts where voids due to trapped air are likely to be most undesirable since they weaken the structure.

As discussed above in respect of the inventive pre-form, the recesses may be provided during consolidation of the pre-form, making the production of the pre-form more efficient by performing several steps simultaneously.

As also discussed above in respect of the inventive pre-form, the recesses may be provided by means of an imprinting technique.

The discussion above in respect of the inventive pre-form is in applicable parts also relevant for the method of producing a pre-form. Reference is made to that discussion.

According to another aspect of the present invention, there is provided a method of producing a reinforced composite structure, comprising: providing a first reinforcing pre-form comprising fibres and a binding agent; providing a second reinforcing pre-form, comprising fibres and a binding agent, at least partially overlapping said first pre-form in an overlap area, wherein at least one of said first and second pre-forms comprises recesses, which recesses form channels in an interface between said first and second pre-forms in said overlap area; and applying a vacuum to consolidate the structure, such that air trapped between said first and second pre-forms in said overlap area may be evacuated from said overlap area through said channels.

When producing a composite structure, such as a spar of a wind turbine blade, several layers of a composite sheet material are generally placed on top of each other to form a larger composite structure. In some cases the sheet material is wound several laps around a mandrel. Depending on the intended use of the composite structure, it may be desirable to reinforce the structure in certain places where the structure is expected to be required to withstand a lot of strain or stress. In some cases it may be desirable to reinforce the entire structure.

The reinforcement may be achieved by including a composite layer of higher structural strength than the other layers of the composite structure. If, for instance, the composite structure is built up by layers of glass fibre composite, the structure can be reinforced by one or several layers of carbon fibre composite. In order to realise this reinforcement, pre-forms may be used to form a reinforcing composite layer within a composite structure. The pre-forms may be in accordance with the above discussions relating to other aspects of the present invention.

In certain cases, a single pre-form is not enough to reinforce a composite structure, especially if the structure is large such as is the case with a wind turbine blade spar which may be e.g. 40 m long. Then, a plurality of pre-forms are used. In order for the plurality of pre-forms to continuously reinforce a large part of the composite structure, the pre-forms may be placed overlapping each other, e.g. in the longitudinal direction of the pre-forms.

The pre-forms are provided with recesses, such that channels are formed between the pre-forms where they overlap with each other so that at least some of any air trapped between the pre-forms may escape through said channels during consolidation of the structure. It is of great importance to be able to remove such air trapped in an overlap between two pre-forms, since that air will otherwise weaken the composite structure, and it will weaken the structure in the very place where it was desired to reinforce it with the pre-forms. It is thus very important to remove as much as possible of any air trapped between two overlapping pre-forms in order to obtain a strong connection between said pre-forms and thus obtain the desired reinforcement of the composite structure.

When a vacuum is applied to the composite structure in order to consolidate said structure, removal of air from the overlap between two pre-forms is facilitated by the channels present in the interface between the two pre-forms. The recesses forming the channels can be integrated in a major surface of one or both of the overlapping pre-forms.

In some cases it may not be enough to use two overlapping pre-forms to reinforce a composite structure. Then further pre-forms are used, before consolidation of the composite structure, overlapping with one or more of the previously used pre-forms. Thus, the combined area covered by the overlapping pre-forms can be expanded infinitely both lengthwise, i.e. the pre-forms are overlapping at their transverse edges at the end portions of the pre-forms, or widthwise, i.e. in a latitudinal direction, the pre-forms overlapping at their longitudinal edges.

The desired size of the overlap area depends on the requirements placed on the reinforcement and is a trade-off between how much area to cover and the strength of the connection. Also, the material of the pre-forms is often more expensive than the rest of the material of the composite structure, and therefore it is not desirable to use more pre-forms than necessary to cover an area.

It is of course also possible to place two or more pre-forms on top of each other, completely, or almost completely, covering each other, if a higher structural strength in that place is desired than is obtainable from a single layer of pre-forms.

A mandrel may be used to produce the composite structure, e.g. when producing a wind turbine blade spar. In that case the first reinforcing pre-form is placed on said mandrel, either directly on the mandrel or with one or more layers of composite sheet material between the mandrel and the pre-form. The second pre-form is then placed on the mandrel, overlapping the first pre-form.

If the composite structure is not fully saturated with the binding agent prior to consolidation, additional binding agent may be infused into the structure by means of the vacuum applied during consolidation, e.g. by means of a vacuum pump, sucking the binding agent into the structure. In this case, the channels in the interface between two overlapping pre-forms may facilitate infusion of the binding agent into the structure by guiding the binding agent. The channels may thus have a double function, both guiding air out of the structure and guiding the binding agent into the structure.

If, on the other hand, the structure, or parts of the structure, is saturated with the binding agent prior to consolidation, such as if the structure, or at least the pre-forms, is pre-impregnated, the binding agent may instead flow out of the structure, together with any trapped air, through the channels in the interface between two overlapping pre-forms.

The channels may be allowed to collapse during the consolidation, possibly at the end of the consolidation so that any trapped air has first had time to escape through the channels. The channels can be made to collapse e.g. either by the force applied when the pre-forms are sucked together by the applied vacuum, and/or by heating the structure during consolidation to lower the viscosity of the binding agent, thus allowing the pre-form to change its surface structure, possibly in combination with the effect of the applied vacuum. By collapsing the channels, a better and stronger connection between the pre-forms is obtained, thereby improving the strength of the composite structure.

In some cases it may, however, be desirable not to allow the channels to collapse, such as if there is a concern that not all trapped air will have time to escape, or it may not be practically possible to collapse the channels. In such cases it is preferred to fill the channels with the binding agent so that no voids are present in the interface between overlapping pre-forms, or so that the void volume is at least minimised.

The structure may be heated during consolidation. This may facilitate the collapsing of the channels, as discussed above, but may also more generally facilitate the consolidation of the structure.

If a thermosetting binding agent, such as a thermosetting epoxy resin, is used, the structure can be heated in order to cure the binding agent, making the composite structure more rigid, hard and strong. In order for the curing process to be sufficiently fast for industrial production, the structure is preferably heated to at least 100° C., more preferably to at least 115° C. It is, however, understood that the convenient temperature depends on which thermosetting binding agent is used, since different agents cure at different temperatures and at different speeds.

In some cases it may be desirable to first combine two or more pre-forms and then use the combined pre-forms in a larger composite structure, e.g. placing the combined pre-forms on a mandrel as discussed above. Optionally, the combined pre-forms may be consolidated together, removing air from the interface formed between the overlapping pre-forms, before they are included in the composite structure. The combined and consolidated pre-forms may even be cured, forming a combined hard reinforcement part, before they are included in the composite structure. Curing the combined pre-forms may be convenient if the pre-forms, pre-impregnated or not, are to be included in a composite structure which will be injected/infused with the binding agent during consolidation of the composite structure.

Thus, according to another aspect of the present invention, there is provided a method of combining pre-forms for production of a reinforced composite structure, comprising: providing a first reinforcing pre-form comprising fibres and a binding agent; providing a second reinforcing pre-form, comprising fibres and a binding agent, at least partially overlapping said first pre-form in an overlap area to provide combined pre-forms, wherein at least one of said first and second pre-forms comprises recesses, which recesses form channels in an interface between said first and second pre-forms in said overlap area; and applying a vacuum to consolidate the combined pre-forms, such that air trapped between said first and second pre-forms in said overlap area may be guided out of said overlap area through said channels.

The discussions above in respect of the inventive pre-form and the inventive method of producing a pre-form are in applicable parts also relevant to the methods of producing a reinforced composite structure and of combining pre-forms for production of a reinforced composite structure. Reference is made to these discussions.

According to other aspects of the present invention, there are provided a wind turbine blade manufactured in accordance with the above discussed inventive method of producing a reinforced composite structure and a wind turbine blade comprising the above discussed inventive consolidated pre-form, and a wind turbine generator comprising any such wind turbine blade.

Production of wind turbine blades for wind turbine generators is a major application for techniques of making composite material structures. The blades are large structures, e.g. 40 m long, and need to withstand high stress while still being as light as possible. The production of wind turbine generators is thus an excellent example of an application where the present inventive techniques, discussed above, can be used with superior results.

Although the production of wind turbines is a preferred area of application of the present invention, the invention is also applicable in other areas relating to composite materials, which is readily appreciated by the skilled man.

BRIEF DESCRIPTION OF THE DRAWINGS

The present invention will be illustrated by way of non-limiting examples with reference to the accompanying drawings, wherein.

DETAILED DESCRIPTION OF PREFERRED EMBODIMENTS

A recess, as the term is used herein, can be formed either as a concave structure in a major surface of an inventive pre-form, e.g. by imprinting, carving, corroding, eroding, die-cutting, etc, into the surface, or as spaces between ridges, or hills, applied to the pre-form surface, forming a three-dimensional structure on top of said surface, e.g. by printing, such as with a binding agent, on the pre-form surface, etc. The recesses may be straight, curvy or have any other geometrical shape; they may have a constant or varying depth, both in their longitudinal and transverse directions; and they may be separate from each other or interconnect with each other. The recesses may even for the most part interconnect with each other, only intermittently being briefly separated from each other, such as if the recesses are formed by applying hills to the pre-form surface as discussed above.

A channel, as the term is used in the present application, is generally a structure formed by a recess in a first pre-form surface, and a second surface, such as a second pre-form surface, covering said recess in the interface between the two surfaces overlapping each other. Thus, a channel may be formed allowing air trapped in the interface to travel through said channel to an outlet of the formed channel along the edges of two overlapping pre-forms. The recesses of the surface may be separate from each other, but they may also be interconnected. In one embodiment, the channel structure is provided by forming a plurality of hills, or bumps, on the pre-form surface, after which the pre-form surface is applied to the surface of another pre-form, forming channels in the interface between the surfaces. Thus a structure is formed where any trapped air may travel in any number of directions, whereby the structure can be regarded as a large number of interconnecting channels.

That the pre-form is consolidated means that the different components of the pre-form, such as fibres and a binding agent, are consolidated to a single composite unit. This consolidation process may be aided by e.g. enclosing all the layers/components of the pre-form in an enclosure and removing air from the enclosure, whereby trapped air within the pre-form may be removed. The vacuum consolidation of the pre-form may be advantageous from a structural strength point of view since trapped air may decrease the strength of the finished pre-form, and may thus ultimately decrease the strength of the final composite structure in which the pre-form is used. Also, the consolidation may be aided by an increased temperature, making the binding agent less viscous and facilitating the removal of air from the pre-form. If the binding agent is thermosetting, it may, in some embodiments, be allowed to partly cure during the consolidation of the pre-form. The later consolidation of a composite structure comprising the consolidated pre-forms is analogous to the consolidation of the pre-form, but after that later consolidation, the binding agent may be allowed to cure completely.

A pre-preg is a pre-impregnated composite material, i.e. the fibres are impregnated with a binding agent before final use of the pre-preg. The impregnation can be made to saturation.

A mandrel, as the term is used herein, is a structure on which the composite structure is built. It may e.g. be a long bar or pipe on which layers of fibres and binding agent are placed or wound. The mandrel is then removed before the composite structure, such as a wind turbine blade spar, is finished.

By "imprinting" is in this application meant forming recesses by applying a pressure. Preferably, a punch is used to press into a major surface of a pre-form in order to form a pattern of recesses, or channels, into the surface. This is facilitated by the binding agent of the pre-form not being cured, and thus ductile.

The binding agent may be any binding agent able to bind the fibres, or fibre tows, to each other, thus stabilising the pre-form. The binding agent may e.g. be a resin, an adhesive, such as a polyurethane based adhesive or a one- or two-component adhesive, or any other adhesive. The binding agent may be a curable resin, allowing the pre-form to be made rigid when desired by e.g. applying heat to the pre-form, provided that the resin is a thermosetting resin. The resin may be an organic polymeric liquid which, when converted into its final state for use, becomes solid. As an example, the resin may be an epoxy-based resin or a polyester-based resin, though other resin types may also be applied. Furthermore, one or more different types of binding agents may be used for the preparation of a pre-form. For example, one binding agent may be used to bind tows/yarns/strands of a fibre layer to each other, whereas a different binding agent may be used to bind different fibre layers to each other, forming a laminate. In using different types of binding agents, it may however be an advantage to use binding agents of only one family in order to ensure compatibility between the agents.

The pre-forms of the present invention may be of any size and shape, depending on their intended use. However, for practical manufacturing and handling reasons, a pre-form is preferably not longer than 30 m, not wider than 5 m or not thicker than 20 mm. Also from a handling point of view, the pre-form is preferably not thinner than 1 mm, since the pre-form may otherwise be too flabby. The length of a pre-form is preferably from about 5 m to about 20 m, and the width of a pre-form is preferably from about 0.1 m to about 3 m. The edges of the inventive pre-form are preferably substantially perpendicular to the major surfaces of the pre-form. Specifically the edges are preferably at an angle of 80-100° with respect to the major surfaces of the pre-form.

The fibres or tows/yarns/strands of the inventive pre-form may be unidirectional, parallel to each other, whereby the pre-forms are adapted to withstand stress predominantly in one direction. The pre-forms will be much stronger in the direction of the fibres or tows/yarns/strands than in the direction perpendicular to the same. The direction of the fibres or tows/yarns/strands is also, usually, the longitudinal direction of the pre-form. Other fibre/tow/yarn/strand configurations may be desirable depending on the intended use of the pre-form, such as bidirectional or omnidirectional, or any other configuration.

Preferred embodiments will now be discussed with reference to the accompanying drawings.

Figure 1:
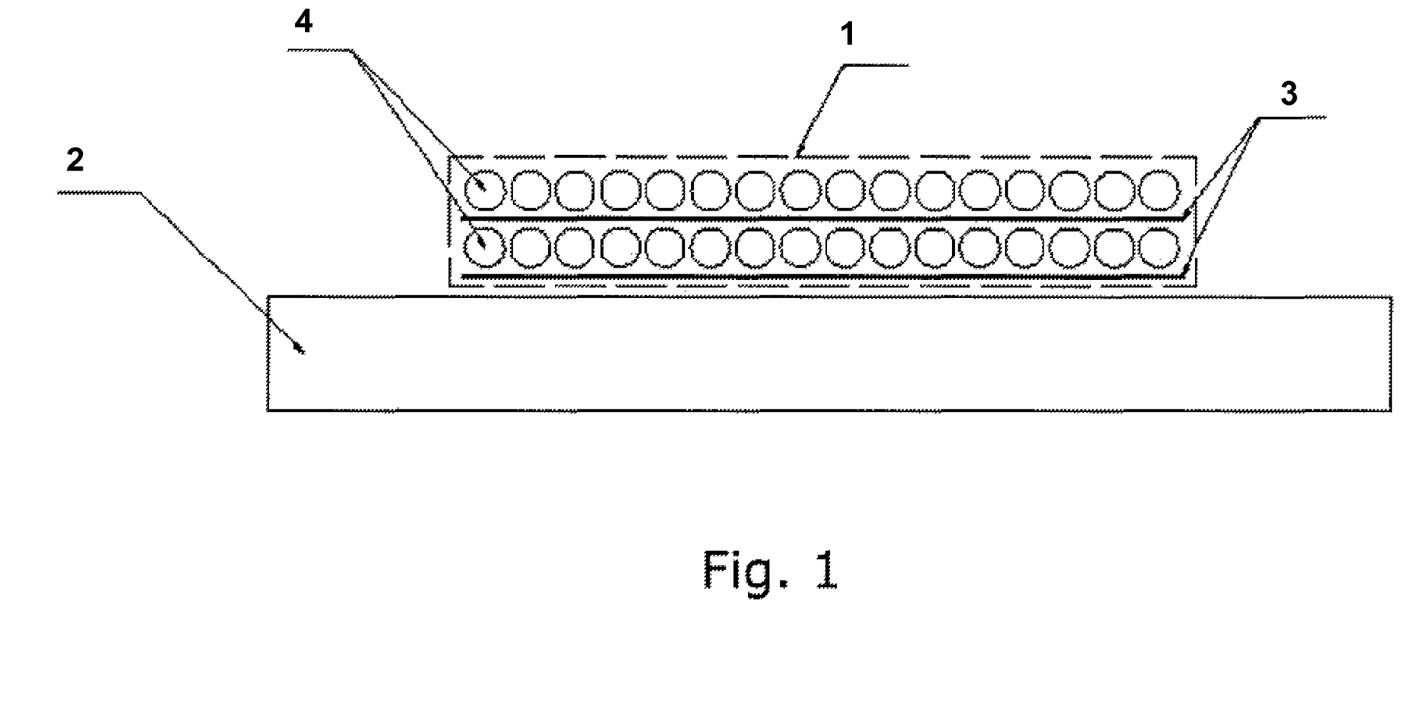
FIG. 1 is a schematic cross-sectional view of an inventive pre-form on a work surface.

FIG. 1 shows a transverse cross-section of a pre-form 1 on top of a work bench 2, on which the pre-form 1 may have been produced. The pre-form 1 comprises a plurality of layers 3 and 4, where the bottom layer is a layer 3 of binding agent on top of which parallel fibre tows form a fibre layer 4. A further binding agent layer 3 and a further fibre layer 4 are also comprised in the pre-form 1 of FIG. 1.

Figure 2:
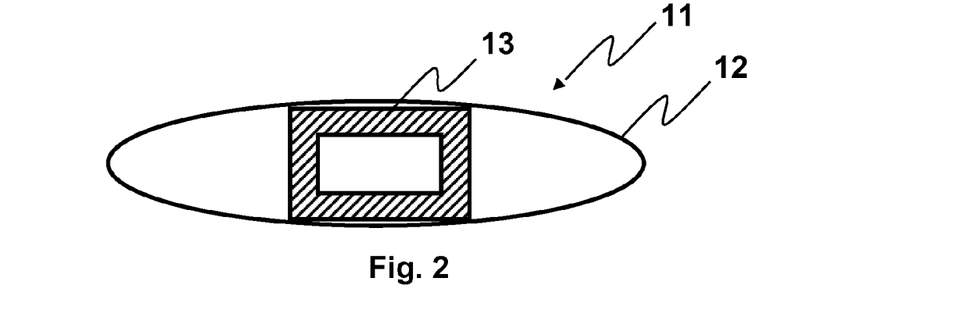
FIG. 2 is a schematic cross-sectional view of a standard wind turbine blade.

FIG. 2 is a transverse cross-section of a standard wind turbine blade 11. The blade 11 comprises a wind foil 12 and a spar, also known as a beam, 13. The wind foil 12 has the main function of providing a desired shape of the blade 11 to optimise the efficiency of the wind turbine of which the blade 11 is a part, whereas the spar 13 is the backbone of the blade 11, making sure the blade 11 is strong enough to withstand the stress put on the blade 11 by its own large size and by the wind. If the spar 13 should fail, the blade 11 will break. The spar 13 is preferably hollow, to keep down the weight of the blade 11, and may have a rectangular cross-section.

Figure 3:
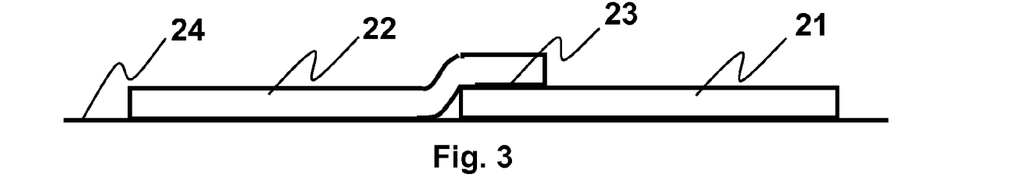
FIG. 3 is a schematic side view of two overlapping pre-forms of the present invention.

FIG. 3 shows how two inventive pre-forms 21 and 22 are placed on a mandrel surface 24 overlapping each other in an overlapping area, forming a lap joint. The pre-forms 21 and 22 may be placed directly on a mandrel, or the surface 24 may be formed of a mandrel with one or more layers of composite sheet material on top of it. The first pre-form 21 has been placed on the surface 24, after which the second pre-form 22 has been placed on the surface 24, overlapping the first pre-form 21, whereby an interface 23 is formed between the pre-forms 21 and 22 in the overlapping area. A lap joint may be formed at longitudinal and/or transverse edges of the pre-forms.

Figure 4:
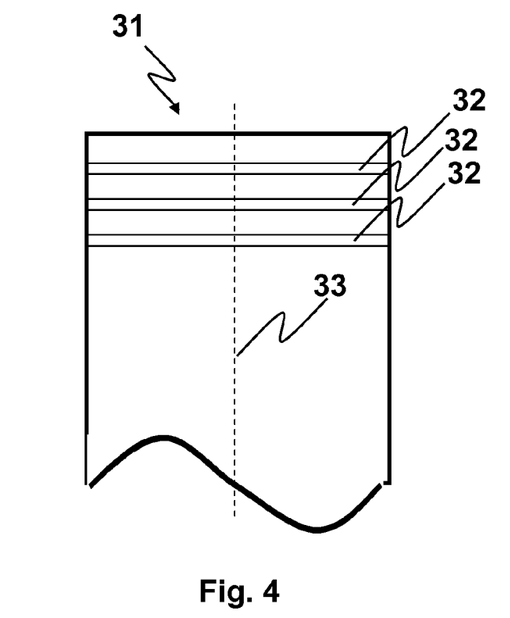
FIG. 4 is a schematic partial top plan view of an inventive pre-form having a recess pattern according to a first embodiment.

FIG. 4 shows a first embodiment of a recess pattern of a pre-form 31 of the invention. Parallel, transverse recesses 32 extend in a straight line from one longitudinal edge of the pre-form 31 to the opposite longitudinal edge of the pre-form 31 perpendicularly across a centreline 33 of the pre-form 31.

Figure 5:
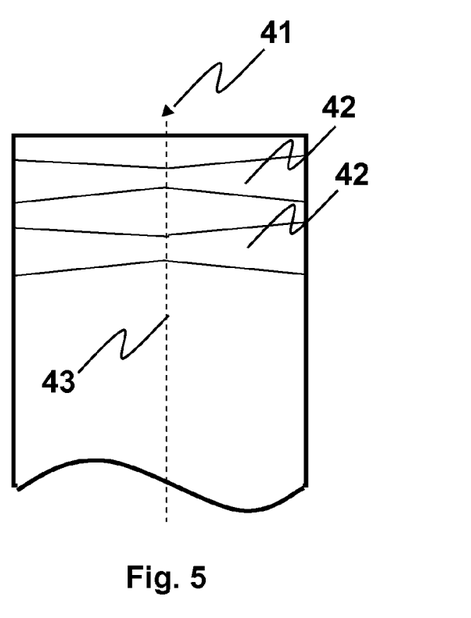
FIG. 5 is a schematic partial top plan view of an inventive pre-form having a recess pattern according to a second embodiment.

FIG. 5 shows a second embodiment of a recess pattern of a pre-form 41 of the invention. Parallel transverse recesses 42 extend from one longitudinal edge of the pre-form 41 to the opposite longitudinal edge of the pre-form 41 perpendicularly across a centreline 43 of the pre-form 41. Again, the recesses 42 run in a substantially straight line between the two longitudinal edges of the pre-form 41, but in this embodiment of the invention, the recesses 42 are successively widening from the centreline 43 to the longitudinal edges of the pre-form 41, such that the recesses 42 are at their widest at said edges and at their narrowest at said centreline 43.

Example 1

Production of a Pre-Preg Pre-Form

A first layer of thermosetting epoxy resin is distributed on a work table. The resin has been heated to reduce its viscosity and make it more sticky, but is not heated enough to start a curing reaction. The layer is made 15 m long. The layer is tapered and is made 1.5 m wide at one end, and 0.5 m at the other end. A first layer of substantially parallel carbon fibre tows is distributed on top of the resin layer, and the tows are cut to correspond to the shape and extension of the resin layer, whereby the tows placed along the centre line of the resin layer are longer than those placed closer to the longitudinal edges of the pre-form. Since the resin is sticky, the tows are fixed against the resin layer. A second layer of resin is then applied on top of the tows, after which a second layer of tows is applied. Further layers are applied until the desired thickness is obtained.

The layers of resin and fibre tows are enclosed in a vacuum bag and the air is sucked out to consolidate the pre-form. During the consolidation, the pre-form is heated slightly to facilitate the consolidation, without curing the resin.

During the consolidation, a punch is pressed onto the pre-form to imprint recesses, about 1 mm deep, in parts of the pre-form's major surfaces. The recesses run transversely from one of the longitudinal edges of the pre-form to the other of the longitudinal edges, and are at their widest at said edges and at their narrowest at a longitudinal centreline of the pre-form.

The consolidated pre-form is allowed to cool down, whereby the resin viscosity is increased, stabilising the pre-form. The consolidated pre-preg pre-form is stored for later use in a composite structure.

Example 2

Production of a Non-Prepreg Consolidated Pre-Form

A pre-form is produced as in Example 1, but with less resin, not saturating the pre-form with resin, allowing resin to be infused at a later stage. The recesses are formed by dripping, or printing, warm resin on top of the pre-form to form a recess pattern on the pre-form surface.

Example 3

Production of a Reinforced Wind Turbine Blade Spar

Substantially endless glass fibre composite sheets are wound around a bar shaped mandrel. In between the glass fibre laps, pre-forms of unidirectional carbon fibres impregnated with epoxy resin are placed.

A first pre-form is placed on top of, and longitudinally along, the mandrel, such that the fibre tows imbedded in the pre-form are aligned with the longitudinal direction of the mandrel. The pre-form has recesses imprinted on the end portion of its top major surface.

A second pre-form is placed on top of and longitudinally along the mandrel, overlapping the end portion of the first pre-form such that the recesses imprinted on the first pre-form form channels in the interface between the two pre-forms. Optionally, a third pre-form may be placed overlapping the second pre-form in the same way as the second pre-form overlaps the first pre-form.

Layers of glass fibre composite sheets are wound around the mandrel, covering the pre-forms and forming the composite structure, i.e. the spar.

The composite structure is enclosed in a vacuum bag and consolidated with the aid of a vacuum pump. During the consolidation, air is sucked out of the composite structure. Specifically, air trapped in the overlap between two pre-forms is removed through the channels, and then also from between the different layers of sheet material to leave the structure. During consolidation, the structure is heated to below the curing temperature of the resin, to make the resin less viscous, facilitating the consolidation and the removal of air.

After the consolidation, or at a late stage of the consolidation, the channels between the pre-forms collapse due to the lowered viscosity of the resin.

After the consolidation, the temperature is raised to 120° C. to cure the resin, making the spar hard and ready for use in a wind turbine.

Example 4

Combining Two Pre-Forms Prior to Inclusion in a Larger Structure

A first pre-form is placed on top of a work surface. The pre-form has recesses imprinted at an end portion of its top major surface.

A second pre-form is placed overlapping an end portion of the first pre-form such that the recesses imprinted on the first pre-form form channels in the interface between the two pre-forms. Optionally, a third pre-form may be placed overlapping the second pre-form in the same way as the second pre-form overlaps the first pre-form. The overlapping pre-forms may optionally be bent, or otherwise shaped, to fit in a larger composite structure in which the pre-forms are intended to be included. Optionally, the shaping may be done at a later stage, prior to curing of the pre-forms.

The overlapping pre-forms are enclosed in a vacuum bag and consolidated, removing air trapped in the interface between the pre-forms, through the channels in said interface.

The consolidated overlapping pre-forms are cured at 120° C., after which the combined pre-forms can be made part of a larger composite structure, e.g. in accordance with Example 3 above, or in accordance with a resin infusion consolidation process.

The invention claimed is:

1. A method of producing a pre-form, comprising:
providing a layer of a binding agent;
providing a fibre layer of fibres or fibre tows on the layer of a binding agent to produce a delimited longitudinal sheet-like pre-form of fibres and a binding agent, the pre-form having an upper major surface and a lower major surface;
applying a vacuum to consolidate the pre-form by removing air from the pre-form, and imprinting recesses into at least one of the major surfaces of the pre-form by application of pressure to the at least one of the major surfaces during the consolidation, the binding agent remaining uncured or only partially cured after consolidation, and
wherein at least one of the recesses extends at least from a longitudinal centreline to a longitudinal edge of the pre-form, and
wherein the uncured or only partially cured binding agent in the consolidated pre-form is adapted to enable additional bending and shaping of the pre-form during placement and fitting into a composite structure to be reinforced by the pre-form.

2. The method according to claim 1, wherein the pre-form comprises at least two layers of fibres, separated by a layer of a binding agent.

3. The method according to claim 1, wherein the fibres are impregnated with a binding agent.

4. The method according to claim 1, wherein all of the recesses extend at least from the longitudinal centreline to the longitudinal edge of the pre-form.

5. The method according to claim 1, wherein at least one of said recesses extends at an angle between 30 and 90 degrees in relation to the longitudinal centreline of the pre-form.

6. The method according to claim 1, wherein at least one of said recesses is wider at the edge of the pre-form than at the centreline of the pre-form.

7. The method according to claim 1, wherein said fibres comprise carbon fibres.

8. The method according to claim 1, wherein the binding agent is a thermosetting resin.

9. The method according to claim 8, wherein the thermosetting resin is an epoxy resin.

10. The method according to claim 1, wherein the pre-form has a tapered shape.

11. The method according to claim 1, wherein the imprinted recesses in the pre-form include a plurality of elongated channels separated and spaced apart from one another, with each of the elongated channels extending from an outer edge of the pre-form towards the longitudinal centreline.

12. The method according to claim 1, wherein the pre-form is arranged on a mandrel together with additional fibres in order to form a composite laminate.

13. The method according to claim 1, wherein binding agent is infused into the pre-form.

14. The method according to claim 1, wherein the pre-form is heated during the consolidation.

15. The method according to claim 1, further comprising:
fitting the pre-form into a composite structure to be reinforced, the pre-form being bent and shaped to match the composite structure; and
fully curing the binding agent in the pre-form, after fitting, at an elevated temperature.

16. The method according to claim 1, wherein the binding agent of the pre-form is cured, after consolidation, at an elevated temperature of at least 100° C.

17. A method of producing a reinforced composite structure, comprising:
providing a first longitudinal reinforcing pre-form comprising fibres and a binding agent;
providing a second longitudinal reinforcing pre-form, comprising fibres and a binding agent, overlapping the first pre-form in an overlap area;
applying a vacuum to consolidate the first and second pre-forms and imprinting recesses into a major surface of at least one of the first and second pre-forms by application of pressure to the major surface during the consolidation, which recesses form channels in an interface between the first and second pre-forms in the overlap area, wherein at least one of the recesses extends at least between a longitudinal centreline and a longitudinal edge of the pre-form; and
applying a vacuum to consolidate the first and second pre-forms together to become the structure, such that air trapped between the first and second pre-forms in the overlap area may be evacuated from the overlap area through the channels, the binding agent in the first and second pre-forms remaining uncured or only partially cured after consolidation,
wherein the uncured or only partially cured binding agent in the first and second pre-forms is adapted to enable additional bending and shaping of the pre-forms during placement and fitting into the composite structure to be reinforced by the pre-forms.

18. The method according to claim 17, further comprising providing additional pre-forms, forming further overlap areas comprising channels, before consolidating the structure.

19. The method according to claim 17, wherein the first reinforcing pre-form is arranged on a mandrel together with additional fibres in order to form a composite laminate.

20. The method according to claim 17, wherein binding agent is infused into the structure.

21. The method according to claim 17, wherein the channels are arranged to collapse during the consolidation.

22. The method according to claim 17, wherein the structure is heated during the consolidation.

23. The method according to claim 17, further comprising:
fitting the first and second pre-forms into the composite structure to be reinforced, the first and second pre-forms being bent and shaped to match the composite structure; and
fully curing the binding agent in the first and second pre-forms, after fitting, at an elevated temperature.

24. The method according to claim 17, wherein the binding agent of the structure is cured, after consolidation, at an elevated temperature of at least 100° C.

25. The method according to claim 17, wherein the second longitudinal reinforcing pre-form partially overlaps the first pre-form in the overlap area.

* * * * *